United States Patent Office 3,454,058
Patented July 8, 1969

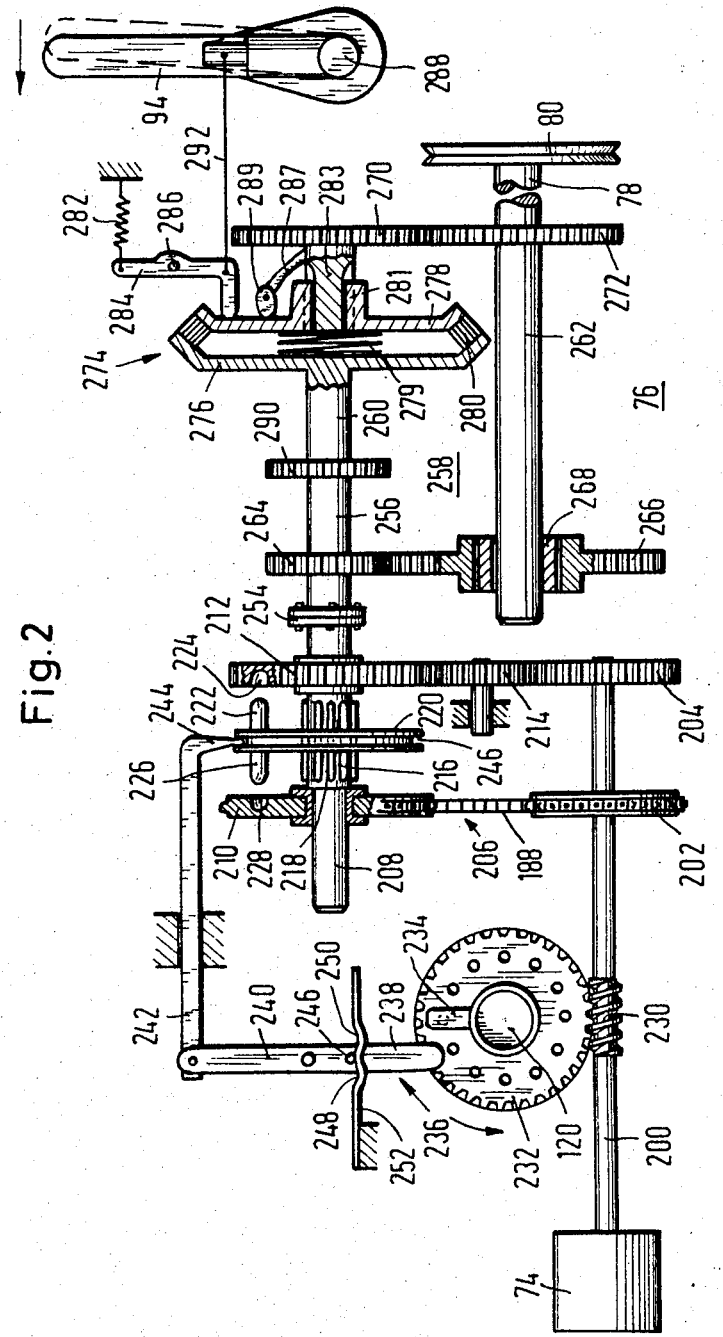

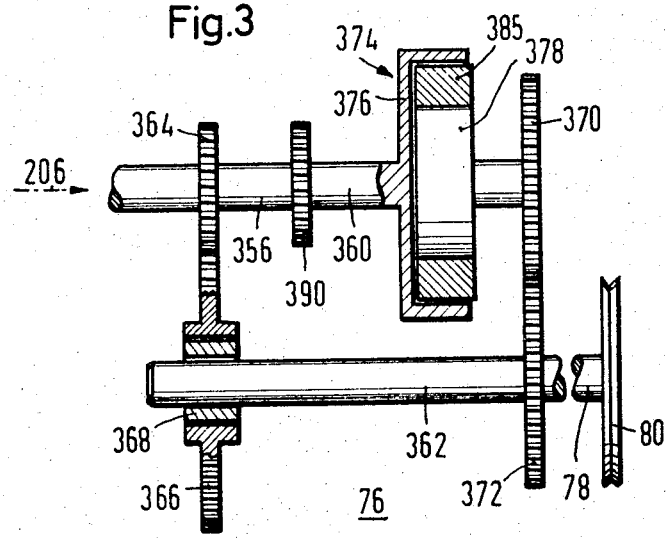
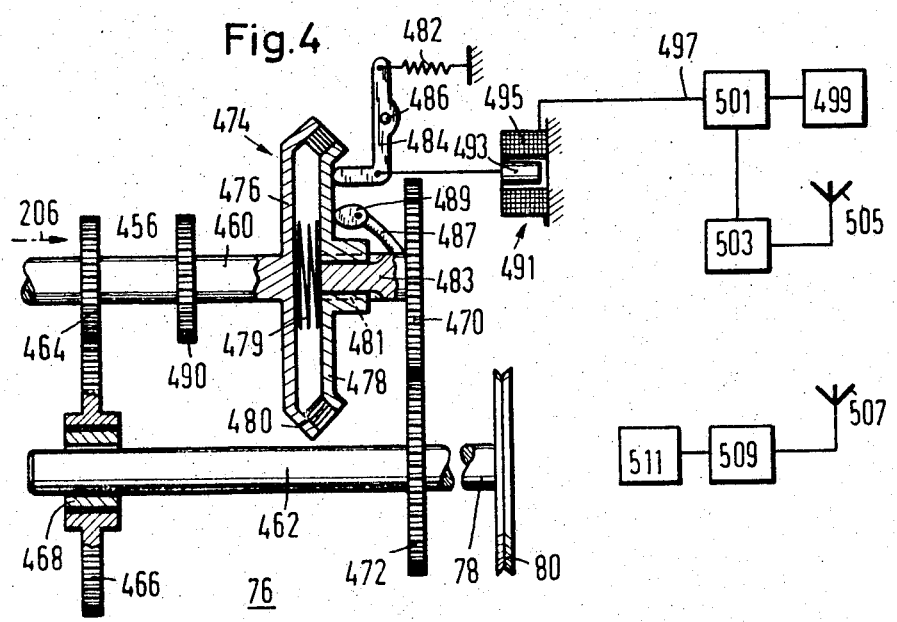

3,454,058
DEVICE FOR REMOVING BRANCHES FROM THE TRUNK OF A TREE
Fritz Fend, Regensburg, Germany, assignor to Firma Fichtel & Sachs A.G., Schweinfurt am Main, Germany
Filed Aug. 11, 1966, Ser. No. 571,760
Claims priority, application Germany, Aug. 14, 1965, F 46,904
Int. Cl. B27b 1/00
U.S. Cl. 144—2                                    10 Claims

ABSTRACT OF THE DISCLOSURE

An automatic climbing apparatus for removing branches from the trunk of a standing tree is equipped with a motor driving the guide wheels which move the apparatus in a helical path about the tree axis. A multiple-speed transmission connecting the motor to the wheels is shifted automatically to a lower gear ratio when the saw mounted on the device encounters an obstacle, thereby reducing the stress on the saw.

---

This invention relates to improvements in automatic apparatus for removing or lopping branches from the trunks of standing, living trees to a certain height from the ground.

It is known to remove branches from the lower trunk portions of standing or living trees by means of motorized devices which travel over the upright surface of the tree in a helical path and trim branches or other projections from the tree surface to reduce the number and size of defects in the lumber eventually produced from the tree. Circular or chain saws are commonly employed on such devices, and inherently tend to cut a planar kerf. Because of the circumferential component of cutting tool movement while the supporting structure moves in a helix about the tree, the cutting tool is subjected to transverse or bending stresses which may cause jamming or damage to the tool. The magnitude of the stresses and the probability of jamming are direct functions of the thickness of the branch to be lopped off and inverse functions of the trunk.

In commonly assigned U.S. patent application Ser. No. 528,754, filed by Gerd Otterbach and Reinbard Kessler, for "Device for Removing Branches From the Trunk of a Tree," now Patent No. 3,385,332, it has been proposed to hold the afore-mentioned transverse or bending stresses to a controlled minimum by providing the device with sensing means which sense the resistance encountered by the saw to its cutting movement through a branch while the device moves in its helical path about the tree, and reduces the speed at which the device advances in its path in response to the sensed resistance. This sensing means is so arranged that the device advances stepwise in response thereto, which may not always be desirable.

It is the primary object of the present invention to provide a variable transmission to control the advancing movement of the support so that speed reduction is effected in response to any resistance encountered by the cutting means without stopping the support. The variable transmission used in this invention has a plurality of transmission stages.

This variable transmission is built into a known type of device for removing branches from the trunk of a tree, which comprises a support, guide wheel means for guiding the support in a substantially helical path about the trunk of the tree, and motor drive means for moving the support in the helical path. Such a device also includes a cutting means mounted on the support for engagement with a branch projecting from the trunk toward the helical path and for cutting movement of the cutting means through the branch when the support moves in this path. The variable transmission of the invention is arranged in control means operatively connected to the motor drive means for reducing the speed of movement of the support.

In the preferred embodiment of the invention, the input of the variable transmission includes a driving shaft connected to the motor drive means and its output includes a driven shaft connected to the guide wheel means. The speed reduction stages are gearings arranged in parallel between the driving and driven shafts for transmitting rotational movement selectively from the driving to the driven shaft. A clutch means is associated with each gearing for selective coupling of the shafts to each other through a selected one of the speed reduction stages.

Other objects and features of the invention will become apparent to those skilled in the art as the disclosure is made in the following detailed description of preferred embodiments of the invention illustrated in the accompanying drawing in which:

FIG. 1 shows a branch removing device in operative position on a partially shown tree trunk in perspective view, portions of the apparatus being broken away for the sake of clarity;

FIG. 2 schematically illustrates the transmission of the present invention for the device;

FIG. 3 shows a modification of a portion of the transmission of FIG. 2; and

FIG. 4 illustrates an actuating mechanism for the transmission of FIG. 2.

Figure 1:
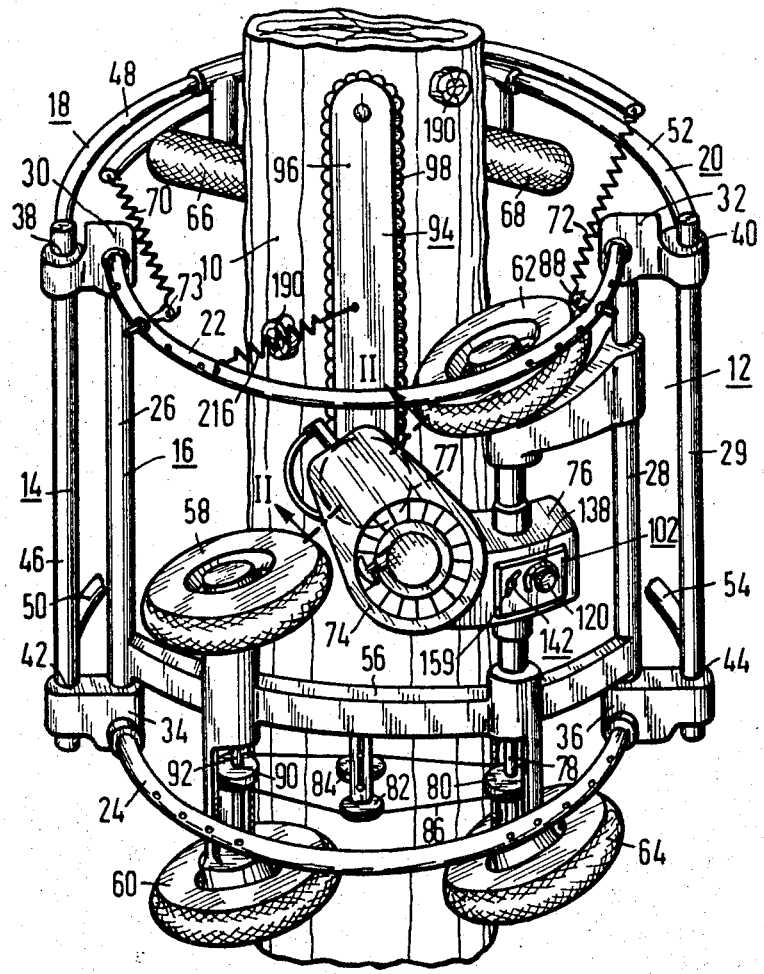

Referring now to the drawing in detail, and initially to FIG. 1, there is seen a portion of an upright tree trunk 10 on which a branch removing device 12 is arranged in its operative position. The operating elements of the device are mounted on a supporting annular frame 14 consisting mainly of three parts 16, 18, 20 which are circumferentially offset about the common axis of the tree and of the device, the frame parts 18, 20 being hingedly attached to the central frame part 16.

The frame part 16 includes two axially spaced arcuate bars 22, 24 extending in respective radial or horizontal planes and two circumferentially spaced axial or vertical rods 26, 28. The bars and rods are fixedly fastened to each other by connectors 30, 32, 34, 36 each of which has an integral bearing lug 38, 40, 42, 44.

The frame part 18 is constituted by a vertical rod 46 journaled in the bearing lugs 38, 42 and by two identical and identically arranged horizontal arcuate bars 48, 50, fixedly attached to the ends of the rod 46, the bar 50 and associated elements being partly omitted for the sake of clarity. The frame part 20 is similarly constituted by a vertical rod 29 journaled in the bearing lugs 40, 44, and arcuate bars 52, 54 fixedly attached to the ends of the rod 29, the lower bar 54 again being partly omitted.

The drive and the cutting device of the apparatus are mounted on an inner frame 56 attached to the rods 26, 28 of the central frame part 16. The drive includes two pairs of driven guide wheels 58, 60, 62, 64. The driven wheels cooperate with idler guide wheels 66, 68 on the upper bars 48, 52 of the frame parts 18, 20 and similar, non-illustrated wheels on the omitted portions of the lower bars 50, 54. All wheels are inclined at the same angle relative to the axis of the tree trunk, and are held in engagement with the bark or surface of the trunk 10 by helical tension springs 70, 72 which connect the free ends of the bars 48, 52 to hooks 73, 88 secured to the bar 22 by engagement with openings in the bar 22 arranged in longitudinal rows so as to permit the frame 14 to be expanded and contracted as needed to hold the wheels in resilient engagement with the trunk 10. It will be understood that the bars 50, 54 are biased toward the tree trunk 10 by non-illustrated springs in the same manner as explicitly illustrated with reference to bars 48, 52.

The wheels on the inner frame 56 are driven by a conventional single-cylinder internal combustion engine 74 whose crankshaft is connected to a drive shaft 78 by a transmission enclosed in two housings 76, 77. Bevel gears, not themselves shown, connect the shaft 78 to the wheels 62, 64. The part of the transmission enclosed in the housing 76 is equipped with a control device 102 of which only an adjusting knob 120, the setting member of a stopping mechanism 142 and associated scales 138, 159 are visible in FIG. 1.

The drive wheels 58, 60 are connected to the drive shaft 78 by a belt 86 trained over a drive pulley 80 on the shaft 78, two guide pulleys 82, 84, and a driven pulley 90 on the common drive shaft 92 of the wheels 58, 60, the last-mentioned wheels being connected to the shaft 92 by bevel gears, not shown.

The engine 74 also provides motive power for a chain saw 94 which includes a guide bar 96 pivotally attached to the housing 77 and a saw chain 98 which is trained in a conventional manner about a sprocket, not visible in FIG. 1 and the nose of the guide bar 94. The sprocket is connected with the engine 74 by the section of the transmission enclosed in the housing 77. A helical compression spring 216 interposed between the guide bar 96 and the frame 14 urges the guide bar 94 to pivot clockwise on the housing 77, as viewed in FIG. 1, whereby the cutting portions of the saw chain 98 are moved forward in the helical path of the device during its upward movement on the trunk 10 when it removes branches 190 from the trunk.

One of the embodiments of the transmission of the present invention, which is enclosed in housing 76, is shown in FIG. 2. This transmission constitutes a control means operatively connected by means of engine 200 to the drive means illustrated as motor 74. A sprocket 202 and a gear wheel 204 are keyed to the shaft 200 and rotatable therewith, the sprocket and gear wheel forming part of a transmission 206 for reversing the rotation of the shaft. This transmission comprises a shaft 208 carrying axially fixed but freely rotatable sprocket 210 and gear wheel 212. Sprocket chain 188 connects sprockets 202 and 210, and an intermediate gear wheel 214 meshes with gear wheels 204 and 212, respectively. In this manner, the sprocket 210 rotates in the same direction as engine shaft 200 while the gear wheel 212 rotates in a direction opposite thereto. A coupling wheel 220 is splined to shaft 208 for axial movement along keyway 216 but being non-rotatable in relation to the shaft. The coupling wheel 220, with its two oppositely projecting catches 222 and 226 arranged to engage bore 224 in gear wheel 212 and bore 28 in sprocket 210 selectively, constitute a clutch selectively connecting shaft 208 with gear wheel 212 or sprocket 210 to rotate the shaft in either direction.

The engine shaft 200 also carries a worm gear 230 meshing with a worm gear wheel 232 to drive the same slowly. The worm gear wheel carries the previously mentioned adjusting knob 120 which is set according to the desired height to which the device is to be driven. A stop 234 is fixed to the adjusting knob and is arranged to engage lever 236. If, as shown by the arrow, the worm gear wheel 232 runs counterclockwise, the stop 234 will engage the arm 238 of lever 236 and will pivot the same after a number of rotations of shaft 200, which depends on the setting of knob 120. The other arm 240 of lever 236 is pivoted to a push rod 242 which carries on its outer end an entrainment means or catch 244 engaging a circumferential groove 246 in the coupling wheel 220. Thus, when the knob stop 234 engages and pivots lever 236, the coupling wheel is axially moved. Thus, upon reaching the desired height, the clutch is operated to reverse the direction of rotation of shaft 208. The lever 236 carries a pin 246 which is arranged to cooperate with a pair or laterally spaced recesses 248, 250 in a leaf spring 252 to hold the lever in two respective end positions.

Reversible shaft 208 is connected to primary or driving shaft 256 of a variable transmission gear 258 by means of joint 254 interconnecting the two shafts for unitary rotation, shaft 208 thus becoming the input shaft of the variable transmission gear. The latter comprises also a secondary or driven shaft 262 coupled to the driving shaft by a first pair of gear wheels 264, 266. While gear wheel 264 is keyed to shaft 256, gear wheel 266 is mounted on driven shaft 262 by means of an overrunning or slip coupling 268. In this manner, rotation is imparted to the driven shaft when the driving shaft is rotated but rotational movement cannot be transmitted in the opposite direction.

A second pair of gear wheels 270, 272 selectively couples the driving shaft 256 to driven shaft 262, a clutch 274 being mounted between driving shaft 256 and gear wheel 270. The clutch includes an axially fixed input member 276 and an axially movable output member 278 and a friction member 280 fixed to clutch member 276 and interposed between the two clutch members. The clutch member 278 is splined to the shaft extension 283 for axial movement, the shaft extension carrying the gear wheel 270. A helical compression spring 279 is mounted between the members of the friction clutch and urges the clutch members apart for disengagement of the clutch and gear wheel 270 from driving shaft 256. Counteracting the bias of compression spring 279, a tension spring 282 pulls bell crank lever 284, which pivots about fulcrum 286, into engagement with clutch member 278 to keep the friction clutch engaged. Driven shaft 262 carries the drive pulley 80 (see FIG. 1) which forms the output of the transmission in housing 76 and which operates the drive wheels 58–64 of the device.

The chain saw is pivotally mounted about fulcrum 288. The saw chain 98 is driven by gear wheel 290 carried by driving shaft 256. A linkage rod 292 connects the chain saw 94 with bell crank lever 284. When the device moves upwardly, the chain saw moves circumferentially, as indicated by the arrow in FIG. 2. When the saw contacts a branch during this circumferential movement, it is pivoted into the position indicated in broken lines in FIG. 2, causing the linkage rod 292 to pivot or pull the lever 284 away from clutch member 278, thus enabling compression spring 279 to force the clutch members apart and to disengage the clutch.

To make it possible to block the friction clutch 274 so that it remains engaged even when the chain saw 94 encounters resistance, the shaft extension 283 carries an adjustable cam member 289 on a bracket 287 to bear against the clutch member 278. FIG. 2 illustrates the position of the cam member adjusted to keep the clutch engaged. This position is chosen when it is desired to permit the device to climb rapidly on a tree without regard to dry or feeble branches thereon.

The above-described device operates as follows, as will be at least partially clear from the description of its structure:

As long as chain saw 94 encounters no appreciable resistance in its advance around the tree, motor 74 drives the drive pulley 80 of the drive wheels 58–64 via transmission 206 which rotates shaft 208 in a selected direction and correspondingly rotates driving shaft 256 to operate the driven shaft 262 by means of gearing 270, 272 which is coupled to the driving shaft by engaged friction clutch 274, the driven shaft 262 overrunning the gear wheel 266 due to the slip clutch 268.

When the chain saw contacts a branch and the sensing means causes it to be pivoted in the position shown in broken lines in FIG. 2, friction clutch 274 is disengaged, thus uncoupling gearing 270, 272 from the driving shaft and operating the driven shaft via gearing 264, 266, without interruption.

The gear ratio of gearing 270, 272 is such that the device moves along the tree with considerable speed as long as the chain encounters no obstacle. The gear ratio of gearing 264, 266, on the other hand, is designed to adapt the speed of the device to the speed of the saw chain.

Except for the clutch in the variable transmission, the embodiment of FIG. 3 is identical with that of FIG. 2, and to avoid repetitious description, all parts corresponding in structure and function have been designated with the same reference numeral but increased by 100.

The centrifugal clutch 374 comprises a cup-shaped input member 376 which is fixed to driving shaft 356 and an an output clutch member 378 carrying a weighted element 385. When the device begins operation, the driving shaft 356 rotates so slowly that the weighted element 385 remains out of contact with the cup-shaped clutch member 376. Therefore, rotation is imparted to driven shaft 362 via gearing 364, 366 to drive pulley 90. As the rotational speed of driving shaft 356 increases and the increased rotational speed is transmitted to the driven shaft, the latter will transmit this increased speed to the output clutch member 378 via gearing 370, 372 until, at a given speed, the weighted element 385 will engage the cup-shaped clutch member. The rotation of the driving shaft will now be transmitted to the driven shaft by means of gearing 370, 372 since the clutch connects this gearing to the driving shaft until the chain saw encounters the resistance of a branch and the advancing movement of the device is thus slowed down. At this point, the rotational speed of driven shaft 362 and the corresponding centrifugal force decreases sufficiently for the centrifugal clutch 374 to be disengaged so that the driven shaft is again operated via gearing 364, 366.

The embodiment of FIG. 4 is again identical with that of FIG. 2, except for the operation of the engaging and disengaging means for the friction clutch, all parts corresponding in structure and function having been designated with the same reference numeral but increased by 200 to avoid repetitions.

The bell crank lever 484 for actuation of friction clutch 474 is movable by an electromagnetic actuating mechanism 491. This mechanism comprises a solenoid including a soft iron core 493 slidably mounted in the magnetic coil 495. A source of current 499 is connected to the coil 495 by conductor 497. An operating signal receiver 503 carries a receiving antenna 505 to receive a signal from a sending antenna 507 mounted on signal emitter 509. A signal sender 511 is connected to the signal emitter so that a remote signal may be sent to the switching means 501 connected to the signal receiver 503 for operating the solenoid 491.

This mechanism may be operated in the following manner:

The signal emitter 509 may continuously send a carrier frequency and the signal sender 511 imposes a modulating frequency on the carrier frequency. The carrier frequency is received by the receiver 503 and is demodulated in switching means 501. The resultant low-frequency signal is used for selectively connecting and disconnecting the coil 495 to and from its current source.

What is claimed is:

1. In a device for removing branches from the trunk of a tree, the device including a support; guide wheel means for guiding the support in a substantially helical path about the trunk of the tree; motor drive means for moving the support in said path; cutting means mounted on the support for engagement with a branch projecting from the trunk toward said path and for cutting movement of the cutting means through said branch when tne support moves in said path; and control means operatively connected to said motor drive means for reducing the speed of movement of said support, the improvement in said control means which comprises:
   (a) a variable transmission having a plurality of speed reduction stages; and
   (b) means for shifting said transmission from one to another one of said speed reduction stages.

2. In the device as set forth in claim 1, the input of said variable transmission being connected to the said motor drive means and the output thereof being connected to said guide wheel means, said speed reduction stages being arranged in parallel between said input and said output, and a clutch means associated with each of said transmission stages.

3. In the device as set forth in claim 2, wherein said input includes a driving shaft and said output includes a driven shaft, and each of said transmission stages includes a gearing arranged to transmit rotational movement from the driving shaft to the driven shaft.

4. In the device as set forth in claim 3, wherein the gearing of a first one of said transmission stages delivers a higher rotational speed to said driven shaft, and the clutch means associated with said one transmission stage is arranged selectively to connect the gearing of the one transmission stage to the driving shaft and to disconnect it therefrom, and the gearing of a second one of said transmission stages delivers a lower rotational speed to said driven shaft, and the clutch means associated with said second transmission stage is a slip clutch permitting rotational movement to be transmitted only from the driving to the driven shaft.

5. In the device as set forth in claim 2, remote control means operatively connected to at least one of said clutch means for operating the same.

6. In the device as set forth in claim 2, further comprising means for operating at least one of said clutch means in response to the moving speed of said support.

7. In the device as set forth in claim 6, wherein said clutch means is a centrifugal coupling.

8. In the device as set forth in claim 2, further comprising means for operating at least one of said clutch means in response to a sensed resistance to said cutting movement encountered by said cutting means.

9. In the device as set forth in claim 8, further comprising means for pivotally mounting the said cutting means on the support for pivoting movement in a working plane and resilient means for holding the cutting means against said pivoting movement in the absence of said resistance, said resistance being sensed by the resilient means and said resilient means yielding under said resistance to permit pivoting of the cutting means in said working plane, and said clutch means operating means including a coupling connection between said pivotal cutting means and said clutch means.

10. In the device as set forth in claim 2, further comprising means for blocking at least one of said clutch means in an engaged position.

References Cited

UNITED STATES PATENTS

| | | | |
|---|---|---|---|
| 2,612,724 | 10/1952 | Llewellyn | 144—208 |
| 3,315,714 | 4/1967 | Meier | 144—2 |
| 3,385,332 | 5/1968 | Otterbach et al. | 144—2 |

ANDREW R. JUHASZ, *Primary Examiner.*

F. T. YOST, *Assistant Examiner.*